Patented May 15, 1951

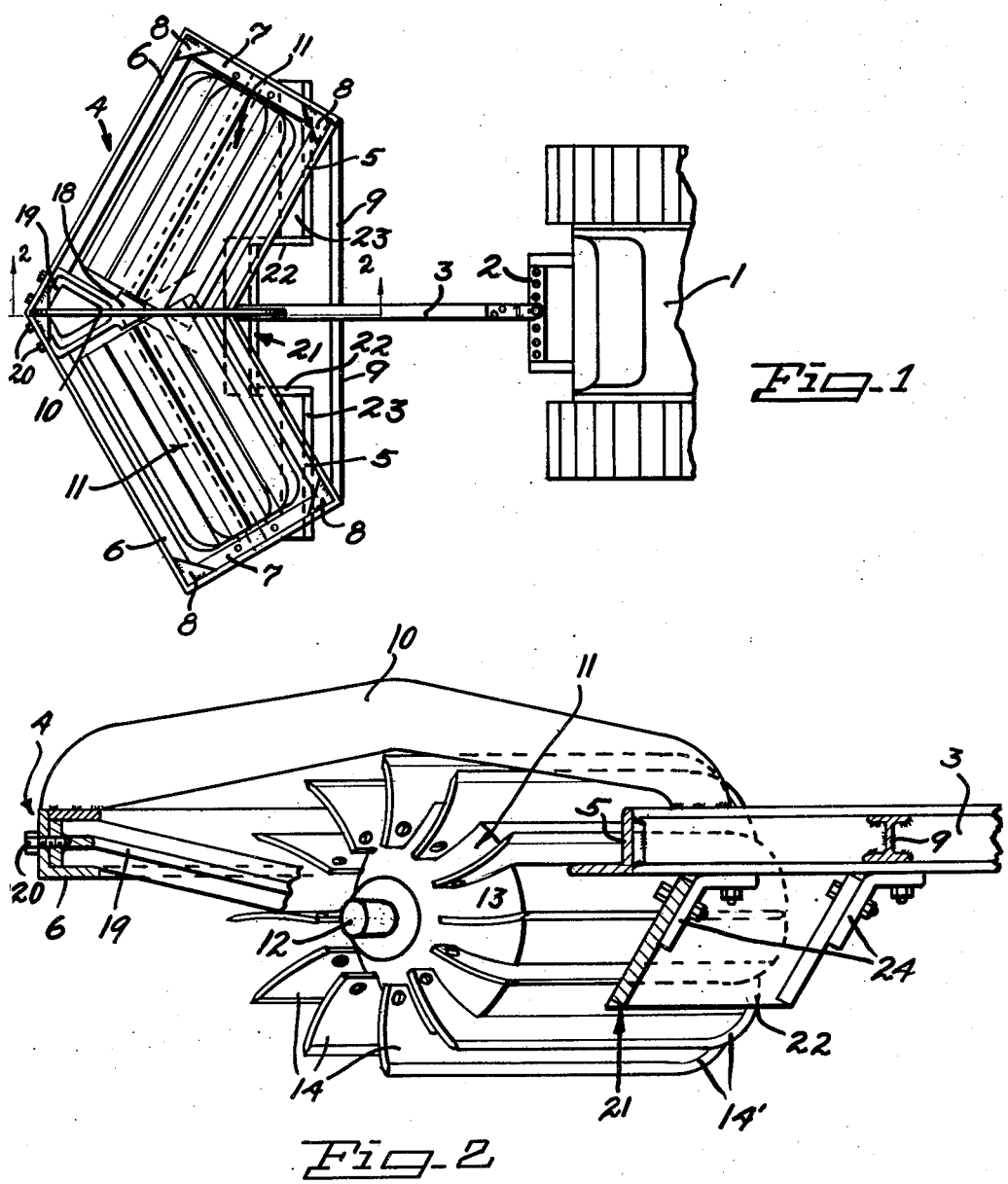
May 15, 1951 — C. S. CADY — 2,553,356
STUBBLE CHOPPER
Filed April 14, 1949 — 2 Sheets-Sheet 1
Inventor
Carl S. Cady
By Glenn L. Fish
Attorney

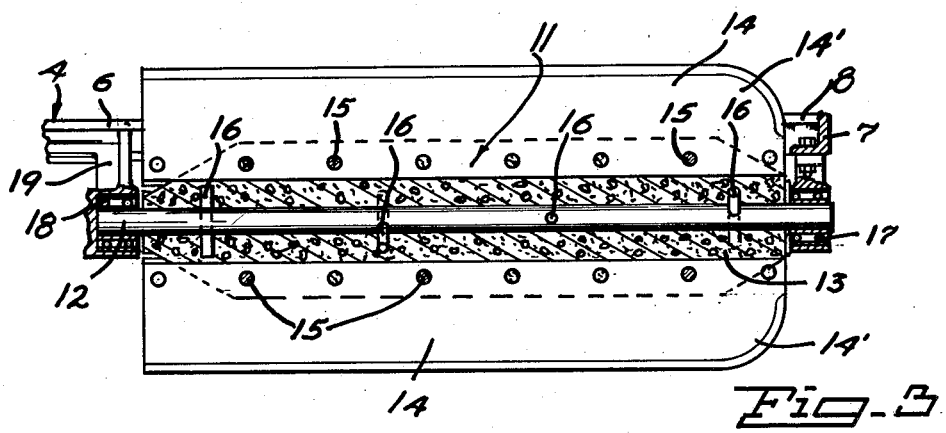
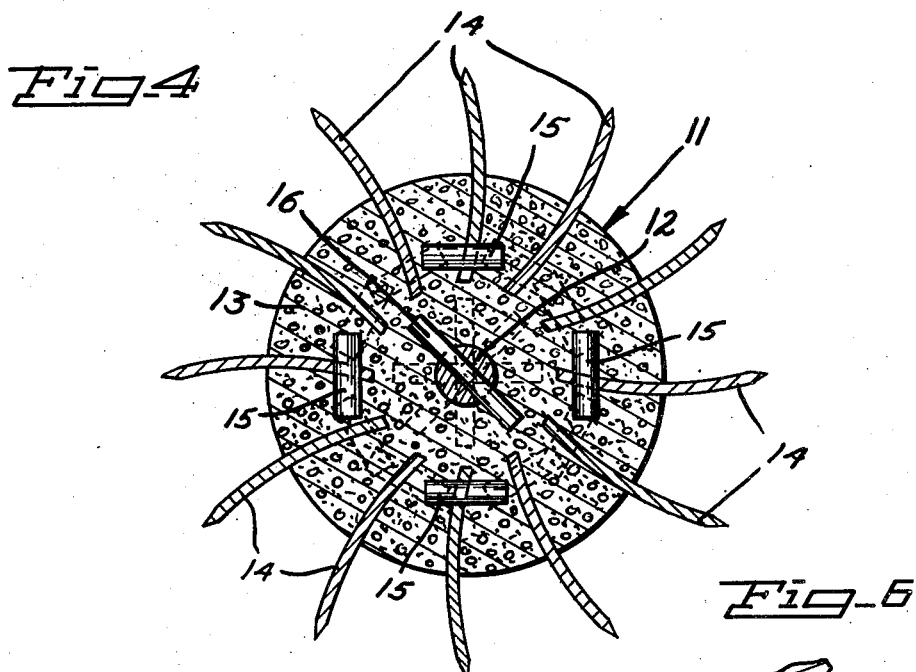
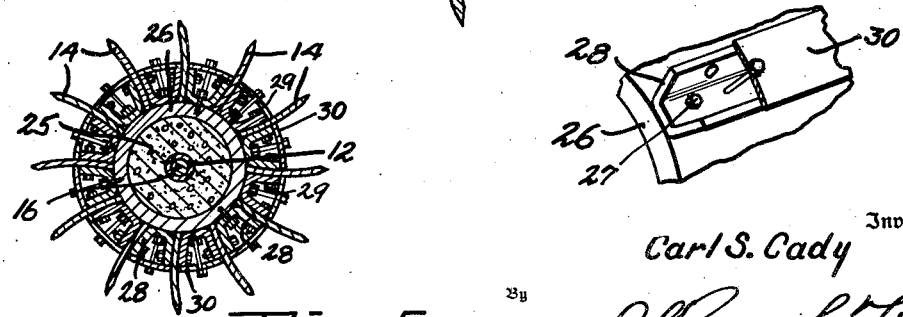

2,553,356

UNITED STATES PATENT OFFICE 2,553,356

STUBBLE CHOPPER

Carl S. Cady, Pullman, Wash.

Application April 14, 1949, Serial No. 87,505

1 Claim. (Cl. 55—61)

This invention relates to agricultural machines and more particularly to a stubble chopper, it being one object of the invention to provide a machine which is adapted to be drawn across a field by a tractor and during such movement cut sod and stubble so that it may be easily plowed under and serve as fertilizer.

Another object of the invention is to provide a stubble chopper having a frame and rollers carried by the frame transversely thereof, the rollers carrying longitudinally extending blades which protrude radially from the rollers and the rollers being formed of concrete so that they will have sufficient weight to force the blades into the ground as the chopper is drawn forwardly and the rollers turn about their axes.

Another object of the invention is to provide the chopper with rollers which are disposed diagonally in such angular relation to each other that they will serve to keep the chopper in a straight path as it is pulled forwardly across a field back of a tractor.

Another object of the invention is to provide a chopper wherein a guide or deflector is mounted across the frame and in front of the rollers in such position that as the chopper is drawn forwardly the deflector will serve to flatten vegetation and allow the rollers to very easily roll forwardly across the vegetation.

The invention is illustrated in the accompanying drawings wherein:

Fig. 1 is a top plan view showing the improved chopper hitched back of a tractor.

Fig. 2 is a sectional view taken longitudinally of the chopper along the line 2—2 of Figure 1.

Fig. 3 is a sectional view upon an enlarged scale taken longitudinally through one of the rollers.

Fig. 4 is a sectional view taken transversely through the roller.

Fig. 5 is a sectional view taken transversely through a roller of modified construction.

Fig. 6 is a perspective view of a fragment of the roller shown in Figure 5.

This improved stubble chopper is intended to be drawn across a field back of a tractor 1 which is of conventional construction and has at its rear a yoke 2 with which the front end of the tongue 3 of the chopper is detachably connected. The tongue projects forwardly from the frame 4 of the chopper midway the width thereof, and referring to Figure 1 it will be seen that the frame has front and rear bars 5 and 6 and end bars 7 which are formed of angle metal and reinforced at their corners by plates 8. Portions of the frame at opposite sides of the tongue diverge forwardly, thus producing a substantially V-shaped frame and in order to brace the tongue against transverse movement there have been provided bracing bars 9 which extend from opposite sides of the tongue and have their outer ends welded to the frame at the junction of front ends of the end bars 7 with the front bars 5. A longitudinally arched tie bar or yoke 10 extends longitudinally of the frame in alignment with the tongue and has its rear end welded to the junction of the rear bars 6 and its front end welded in overlying engagement with the rear end portion of the tongue. Due to this construction the frame and its tongue will be of very strong construction and will not be liable to be broken when subjected to rough use.

Rollers 11 are mounted in the portions of the frame projecting from opposite sides of the tongue and the yoke. These rollers are of duplicate construction and each has a longitudinally extending shaft or axle 12 formed from an iron bar of circular cross section. A mass of concrete constituting the body 13 of the roller is formed about the shaft and in this body of concrete are embedded blades 14 which extend radially of the body and are curved from their inner side edges to their sharpened outer side edges. Openings are formed through the shaft and the inner edge portions of the blades in spaced relation to each other longitudinally thereof, and through these openings are passed pins 15 and 16 which protrude from opposite sides of the shaft and the blades and are embedded in the concrete so that they serve as anchors and very effectively prevent the shaft and the blades from working loose from the body after the concrete has set and hardened. The outer end portions of the shafts are rotatably mounted in bearings 17 carried by the end bars 7 of the frame and the protruding inner end portions of the shafts are rotatably mounted in bearings 18 provided at opposite sides of the front end of a casting or bracket 19 which projects forwardly into the frame from the junction of the rear bars 6 and is secured to the frame by screws 20 passed inwardly through the rear bars and engaged in threaded sockets formed at the rear end of the bracket. When the rollers are mounted in the bearings they extend diagonally in forwardly diverging relation to the tongue and the yoke and their inner ends are in such close proximity to each other that the inner ends of the blades of each roller engage in spaces between inner ends of the blades of the other roller. Outer ends of the blades are rounded, as shown at 14' so that the rollers may turn freely without interference by the blades striking the end bars of the frame. Since the rollers converge towards their inner ends stalks, weeds, and other vegetation which is not chopped into small enough pieces by the blades as the chopper is drawn across a field will be directed towards the meeting inner ends of the rollers and the interfitting portions of the two blades will operate upon it, and thoroughly comminute it. This relation of the rollers to each other also prevents chopped stalks and the like from moving towards and beyond the outer ends of the rollers and forming lines of chopped vegetation across a field.

When the stalks and other vegetation to be chopped is tall enough to prevent the rollers from readily passing over it, it is desirable to have the stalks pressed forwardly towards a flattened position upon the ground. In order to do so there has been provided guide or apron 21 which is formed of strong metal and disposed transversely of the frame in front of the rollers. This guide is pitched so that it projects downwardly at a rearward incline, as shown in Figure 2, and is U-shaped when viewed in top plan, as shown in Figure 1. The arms 22 of the guide extend forwardly and are bent to form wings 23 which project towards opposite sides or ends of the frame, and in order to firmly mount the guide there have been provided brackets 24 which are secured against under faces of the tongue 3 and portions of the frame and have downwardly extending portions to which portions of the guide or deflector are secured. When stalks and tall weeds are engaged by the rearwardly inclined portions of the guide they will be deflected forwardly and downwardly and the blades of the rollers can then easily move downwardly into engagement therewith and chop the stalks into small pieces which can be plowed under. The fact that the curvature of the blades is counter clockwise when viewed as shown in Figure 2 also assists in allowing the blades to move downwardly into compressing and cutting engagement with the stalks.

In Figs. 5 and 6, the modified form is shown as having an axle 12 with the pins 16 and embedded in concrete 25. A cylinder 26 encloses the concrete 25 in concentric relation to the axle 12 and bolted at 27 to the cylinder 26 are longitudinally extending channels 28, spaced from each other about the periphery of cylinder 26. Blades 14 are secured between the spaced pairs of channels 28 by bolts 29 which pass through the openings in the blades and complementary openings in the channels and nuts are then applied. A cover plate 30 is secured over the open face of channels 28 to prohibit dirt and debris from packing therein.

Having thus described the invention, what is claimed is:

A stalk chopper comprising a frame, a tongue projecting forwardly from said frame midway the length thereof, portions of the frame at opposite sides of the frame being disposed at a forward incline, bracing bars extending from opposite sides of the tongue and secured at their outer ends to ends of the frame, rollers rotatably mounted in the portions of the frame at opposite sides of the tongue and conforming to the forward incline of the said portions of the frame, and a guide for depressing tall vegetation extending transversely of the frame in front of said rollers and having end portions and an intermediate portion extending downwardly from the frame at a rearward incline and connected by arms disposed in spaced and parallel relation to opposite sides of the tongue and holding the intermediate portion in offset relation to the end portions rearwardly thereof.

CARL S. CADY.

REFERENCES CITED

The following references are of record in the file of this patent:

UNITED STATES PATENTS

| Number | Name | Date |
|---|---|---|
| 1,336,065 | Bowers | Apr. 6, 1920 |
| 1,786,455 | Robbins | Dec. 30, 1930 |
| 1,887,818 | Michalka | Nov. 15, 1932 |
| 1,895,432 | White | Jan. 24, 1933 |

FOREIGN PATENTS

| Number | Country | Date |
|---|---|---|
| 553,289 | France | Feb. 7, 1923 |
| 27,515 | France | Mar. 18, 1924 |